Sept. 6, 1932.  T. DANIELS  1,875,423
APPARATUS FOR FEEDING DETERMINED BATCHES OF TABLETS
Filed March 25, 1931
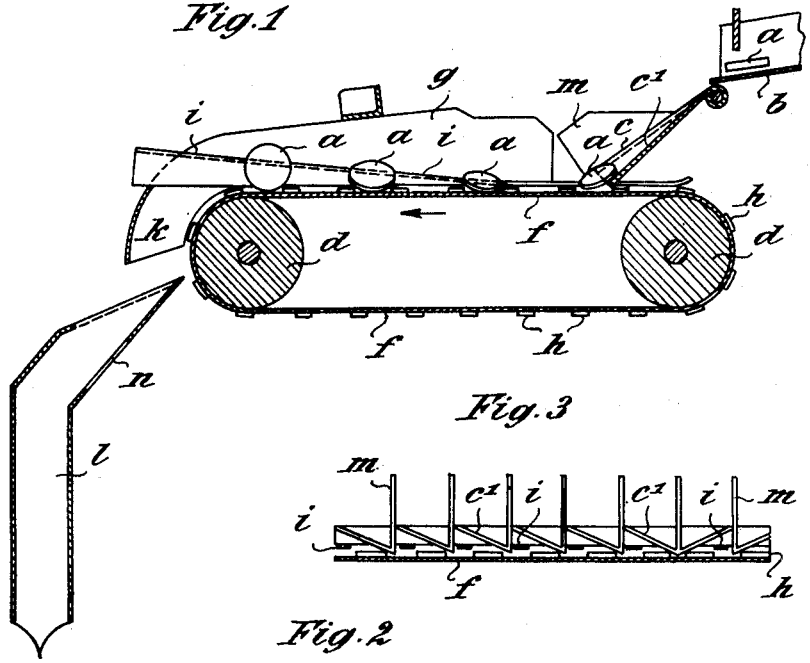
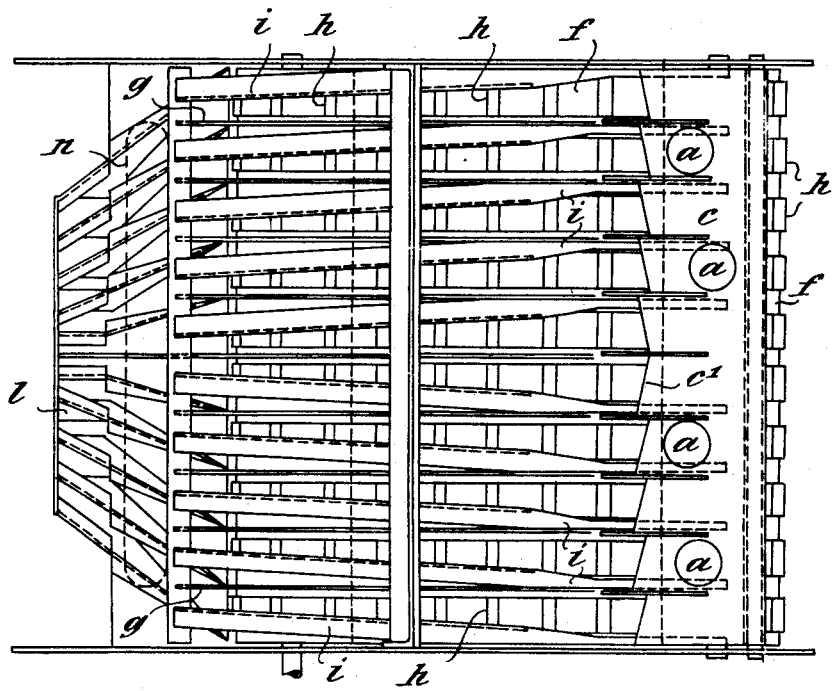
Inventor:
T. DANIELS Patented Sept. 6, 1932

1,875,423

UNITED STATES PATENT OFFICE

THEO DANIELS, OF WEVELINGHOVEN, GERMANY

APPARATUS FOR FEEDING DETERMINED BATCHES OF TABLETS

Application filed March 25, 1931, Serial No. 525,313, and in Germany April 19, 1930.

The present invention has reference to apparatus for feeding determined batches of tablets to wrapping or like apparatus.

An object of the present invention is to provide a machine having a plurality of partitions which form a plurality of longitudinal tracks, a conveyor belt having transverse transporter ledges to convey tablets along the tracks, and stationary slide bars to cause the tablets conveyed along the tracks to assume an upright position.

A further object of the invention is to provide a slide for transferring tablets, from vide a slide for transferring tablets, from known shaker plates in co-operation with a bulk container, to the conveyor belt and slide rails.

Other objects of the invention will be readily appreciated from the following description with reference to the accompanying drawing.

One embodiment of the invention is shown by way of example in the accompanying drawing, in which:

Figure 1 is a longitudinal section.
Figure 2 is a plan.
Figure 3 is a cross section of a part of the slide serving for the transference of the tablets from the shaker plates to the conveyor belt.

The tablets $a$, which are conveyed to the apparatus from a bulk container in well known manner by shaker plates $b$, pass down an inclined slide $c$ to an endless conveyor belt $f$, which is mounted on two rollers $d$ and is slowly driven at a constant speed. The carrying surface of the conveyor belt $f$ is provided with transversely arranged transporter ledges $h$. A number of stationary partitions $g$, which are mounted above, but are independent of, the belt $f$, divide the space above the belt into a number of narrowed tracks. Mounted on the partitions $g$ are slide rails $i$ which, owing to their particular configuration, cause a tablet, carried along by the conveyor belt, to rise on one end and assume a vertical position as it reaches the end of its travel, so that it will pass in the vertical position through the chute $k$ and channels $l$ to a wrapping machine or other device. In the machine shown in the drawing, the slide rails $i$ are of such form that one edge is substantially the same distance from the belt along all its length, whilst the other edge rises along its length from the part where the tablets first engage it to the end where they drop down the chute $k$; also, they gradually extend farther and farther into the channel formed by the partitions $g$, so that the effective width of the channel decreases along its length.

The slide $i$ is also divided into tracks by partitions $m$ and each track has a gradually increasing transverse inclination, so that tablets passing down are correctly inclined when transferred to the belt and slide rails. The channels $l$, which are conveniently made of sheet metal, are provided with a slot or slots $n$, so that should the channels become filled, any tablet passing in thereafter can pass into a container and undesirable blocking of the channels avoided.

I claim:

1. Apparatus for feeding determined batches of tablets to wrapping apparatus, comprising in combination a plurality of stationary walls forming a plurality of longitudinal tracks, a conveyor belt having transverse transporter ledges for conveying tablets along said tracks and stationary slide rails to cause tablets conveyed along said tracks to assume an upright position, together with a member having channels leading to the wrapping apparatus, down which the tablets pass in an upright position.

2. Apparatus as claimed in claim 1, including a slide member for transferring tablets from shaker plates to the conveyor belt, and a plurality of partitions mounted on said slide member to form a plurality of tracks, the bottom surface of each of said tracks having an increasing transverse inclination, so that the tablets are transferred to the conveyor belt and slide rails in an inclined position.

3. Apparatus for feeding determined batches of tablets to wrapping apparatus, comprising in combination a plurality of stationary walls forming a plurality of longitudinal tracks, a conveyor belt beneath and forming bottoms to said tracks, said conveyor belt having means for propelling tablets along said tracks, a guide rail extending between each two adjacent walls substantially from one end to the other thereof, said guide rail rising from the bottom of the respective tracks at one end near one wall and converging toward the adjacent wall, whereby a tablet lying partly on said guide rail and partly on said conveyor belt is positively tilted on said belt into an upright position as it is conveyed by said belt along the track in contact with said rising and converging guide rail, substantially as and for the purposes hereinbefore set forth.

In testimony whereof I have signed my name to this specification.

THEO DANIELS.